G. R. KENDRICK.
FILLER MACHINE.
APPLICATION FILED DEC. 19, 1908.

980,103.

Patented Dec. 27, 1910.
9 SHEETS—SHEET 1.

WITNESSES

INVENTOR
George R. Kendrick
BY
ATTORNEYS

G. R. KENDRICK.
FILLER MACHINE.
APPLICATION FILED DEC. 19, 1908.
980,103.
Patented Dec. 27, 1910.
9 SHEETS—SHEET 2.
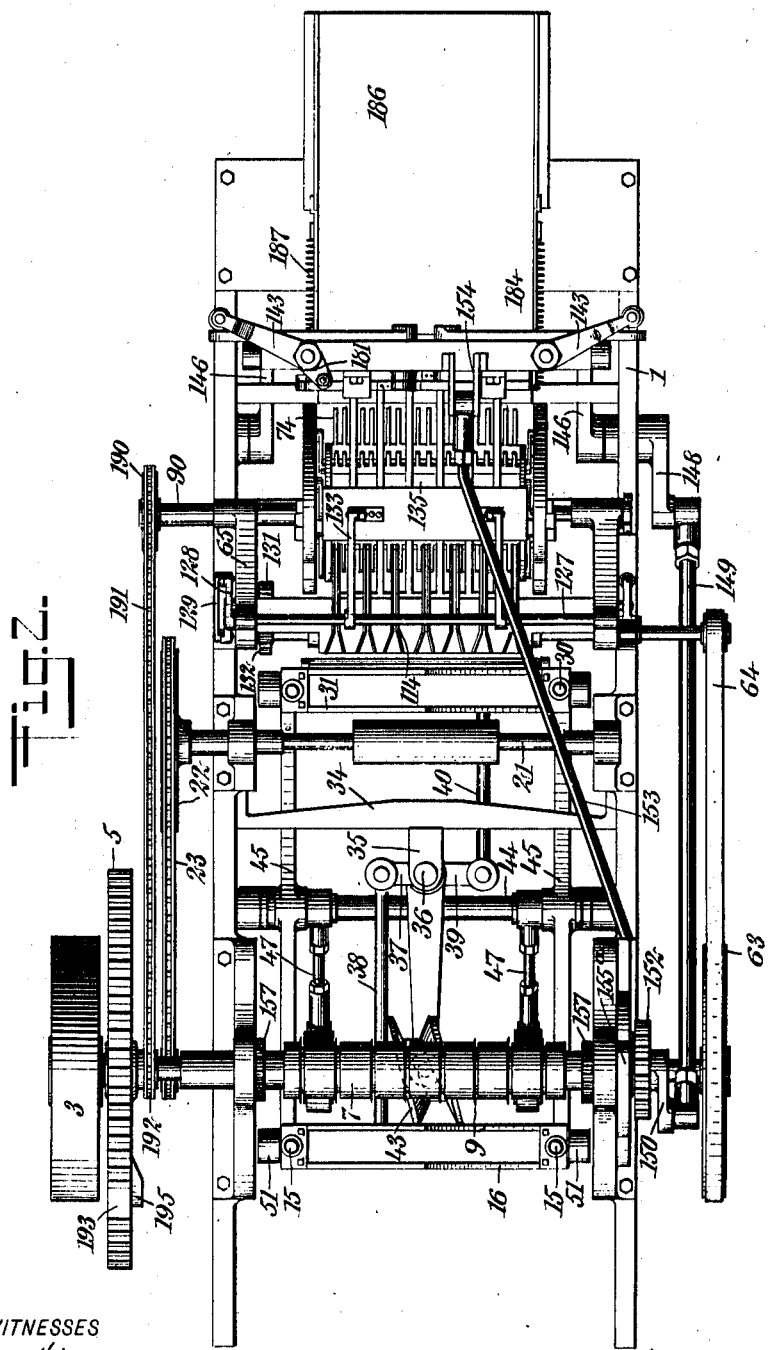
WITNESSES
INVENTOR
George R. Kendrick
BY
ATTORNEYS G. R. KENDRICK.
FILLER MACHINE.
APPLICATION FILED DEC. 19, 1908.
980,103.
Patented Dec. 27, 1910.
9 SHEETS—SHEET 3.
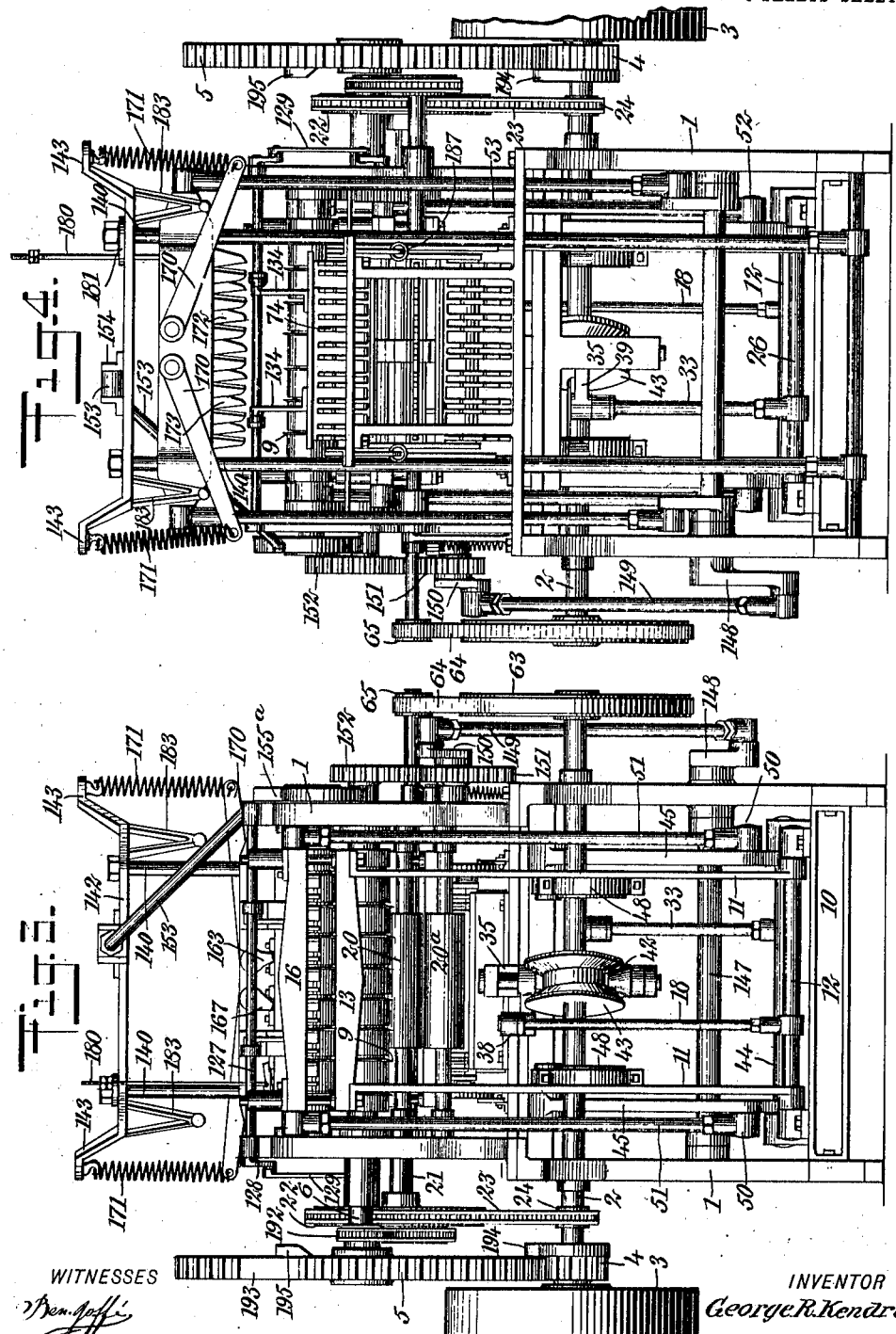
WITNESSES
INVENTOR
George R. Kendrick
BY
ATTORNEYS

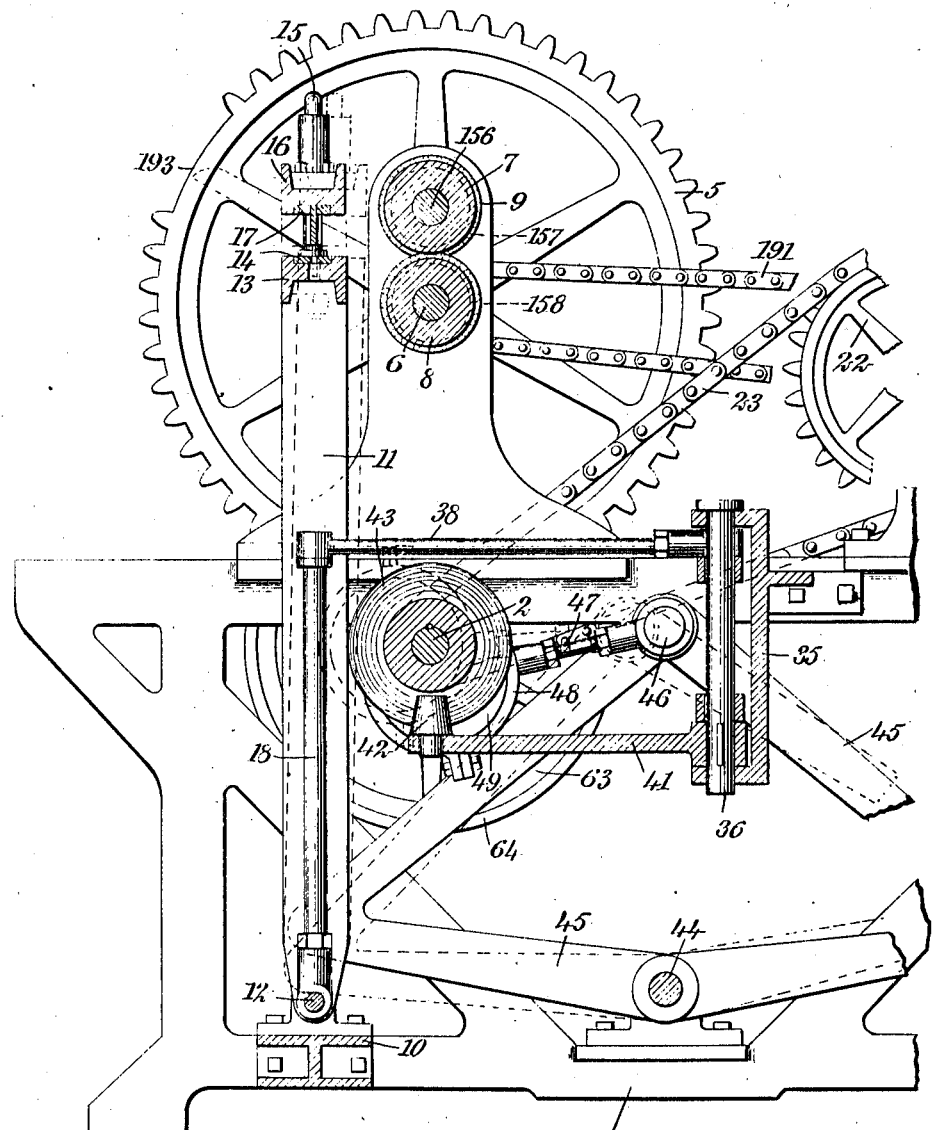

G. R. KENDRICK.
FILLER MACHINE.
APPLICATION FILED DEC. 19, 1908.

980,103.

Patented Dec. 27, 1910.
9 SHEETS—SHEET 5.

WITNESSES

INVENTOR
George R. Kendrick
BY
ATTORNEYS

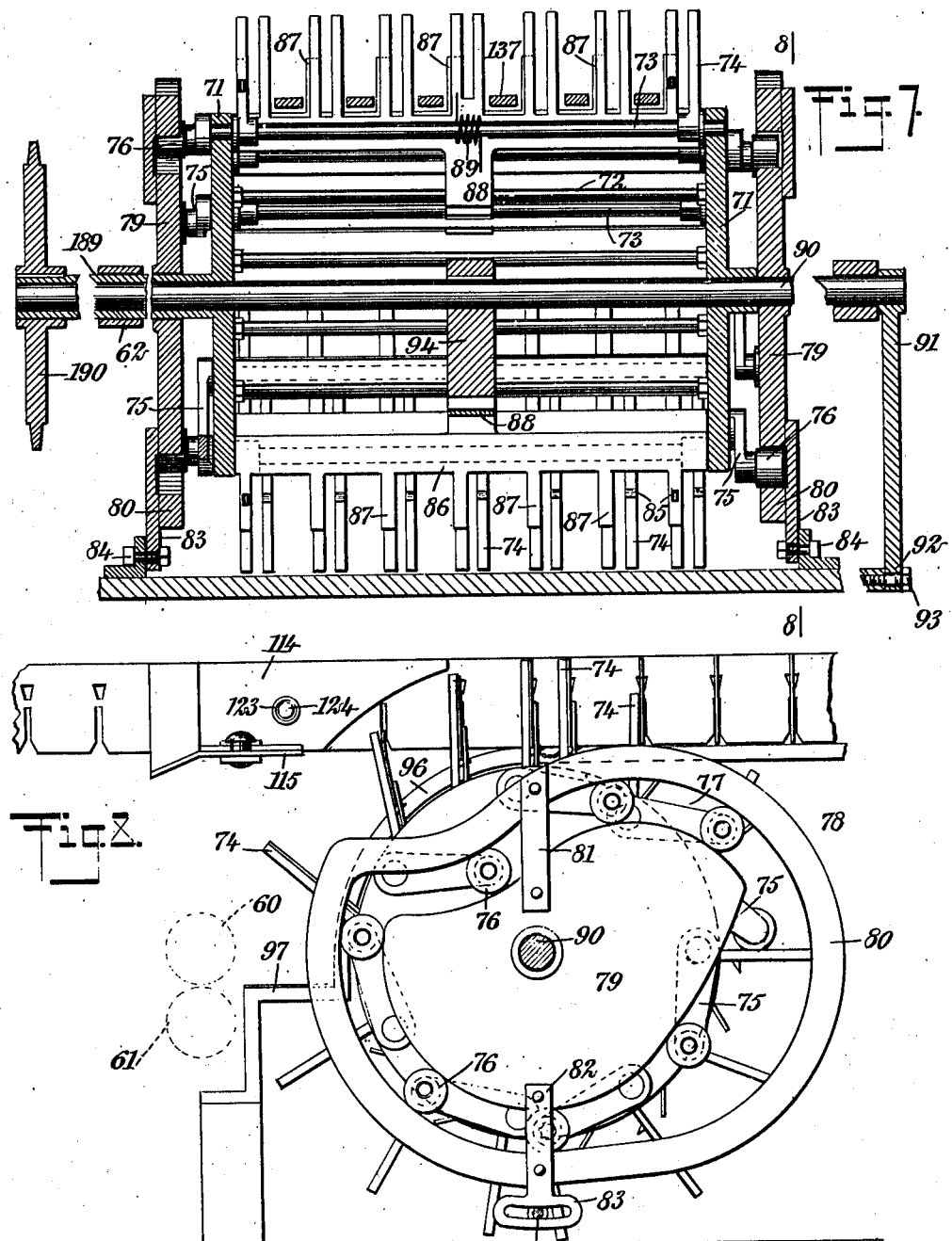

G. R. KENDRICK.
FILLER MACHINE.
APPLICATION FILED DEC. 19, 1908.

980,103.

Patented Dec. 27, 1910.
9 SHEETS—SHEET 7.

WITNESSES

INVENTOR
George R. Kendrick
BY
ATTORNEYS

G. R. KENDRICK.
FILLER MACHINE.
APPLICATION FILED DEC. 19, 1908.

980,103.

Patented Dec. 27, 1910.
9 SHEETS—SHEET 8.

WITNESSES

INVENTOR
George R. Kendrick
BY
ATTORNEYS

G. R. KENDRICK.
FILLER MACHINE.
APPLICATION FILED DEC. 19, 1908.
980,103.
Patented Dec. 27, 1910.
9 SHEETS—SHEET 9.
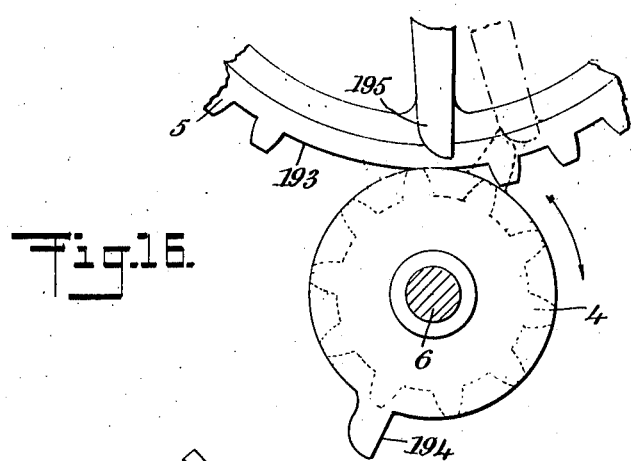
Fig.16.
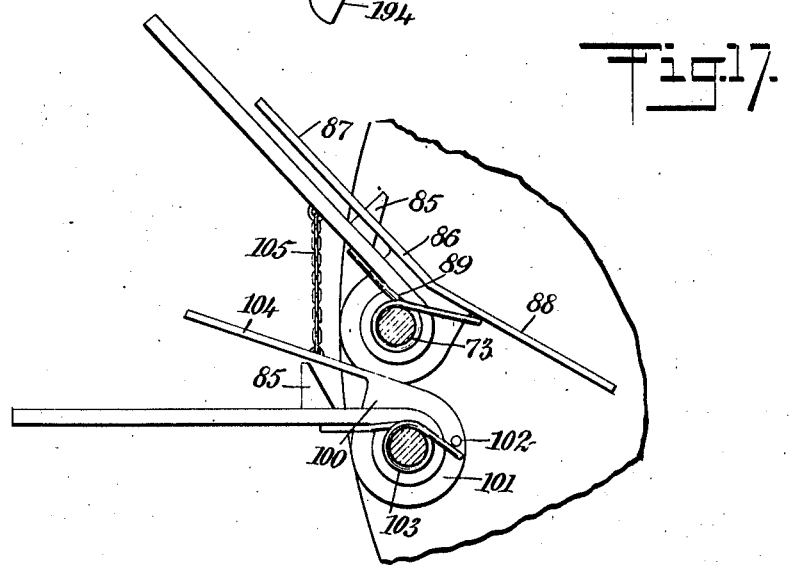
Fig.17.
Fig.18.
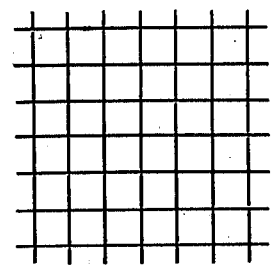
WITNESSES
INVENTOR
George R. Kendrick
BY
ATTORNEYS

UNITED STATES PATENT OFFICE.

GEORGE R. KENDRICK, OF PORTLAND, INDIANA.

FILLER-MACHINE.

980,103.

Specification of Letters Patent.

Patented Dec. 27, 1910.

Application filed December 19, 1908. Serial No. 468,296.

*To all whom it may concern:*

Be it known that I, GEORGE R. KENDRICK, a citizen of the United States, and a resident of Portland, in the county of Jay and State of Indiana, have invented a new and Improved Filler-Machine, of which the following a full, clear, and exact description.

This invention relates to a machine for making fillers for packing cases such as egg boxes. These fillers are formed of strips disposed in parallel rows and extending transversely of each other so as to form separate compartments for the individual articles packed in the packing case.
The object of the invention is to produce a machine which will operate automatically to form these strips in such a way that they can interlock with each other, and further provides means for bringing the strips into position so that they will lock together and form the filler.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
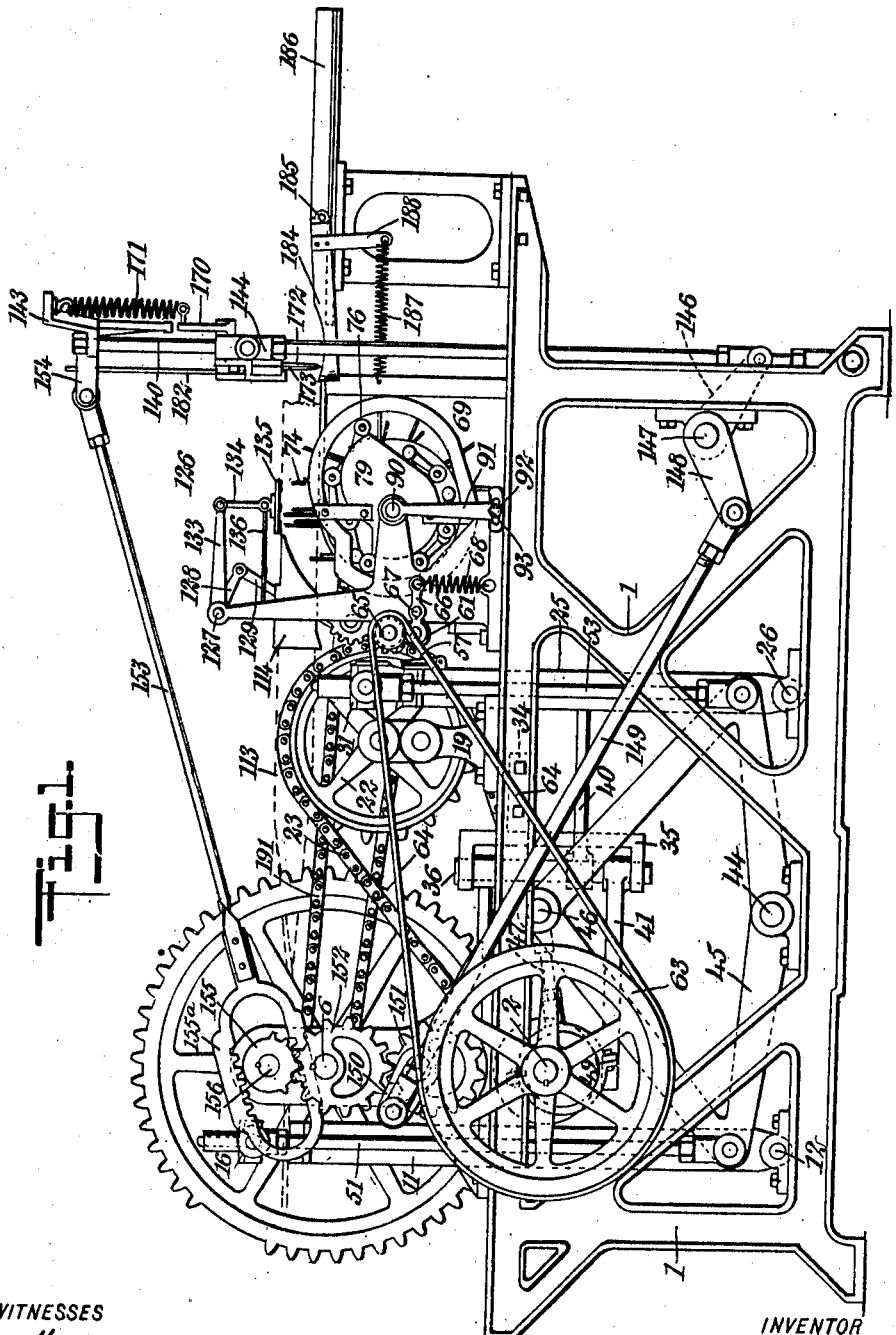
Figure 6:
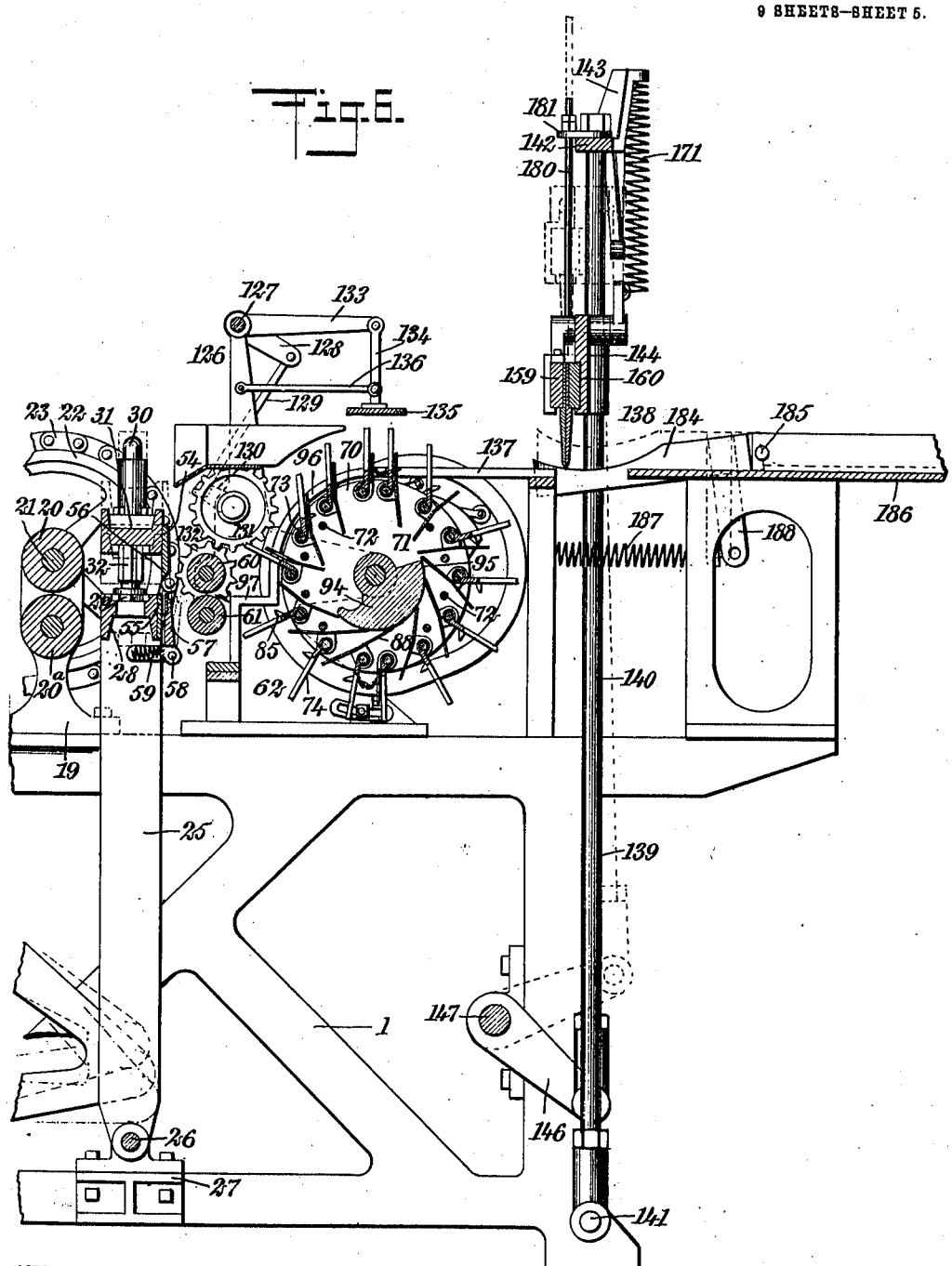
Figure 9:
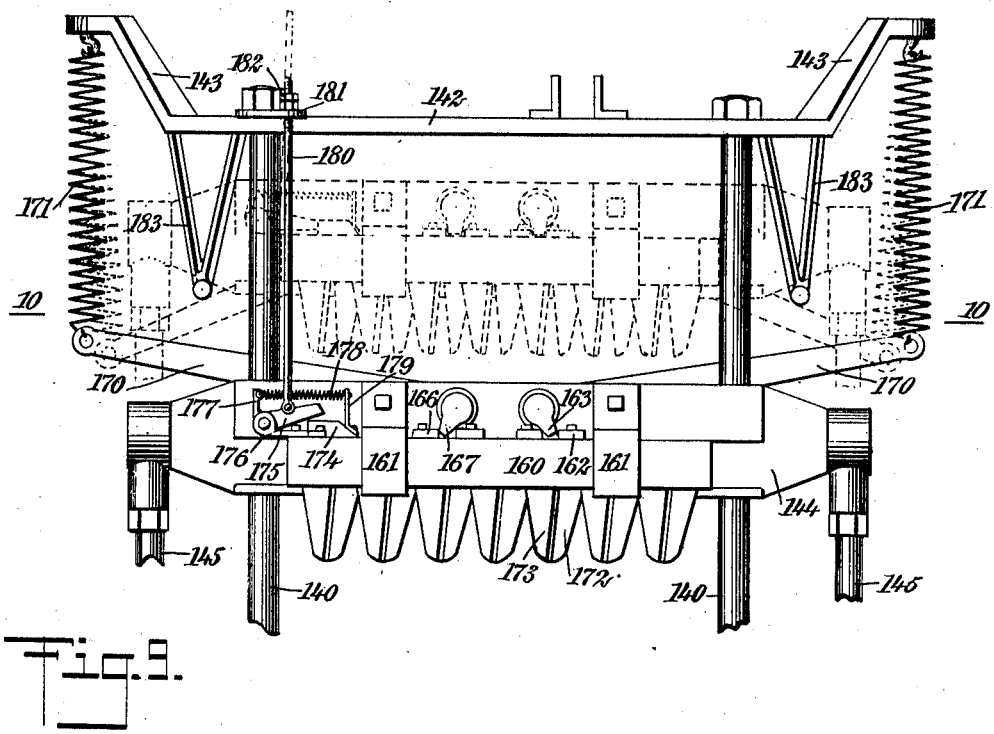
Figure 10:
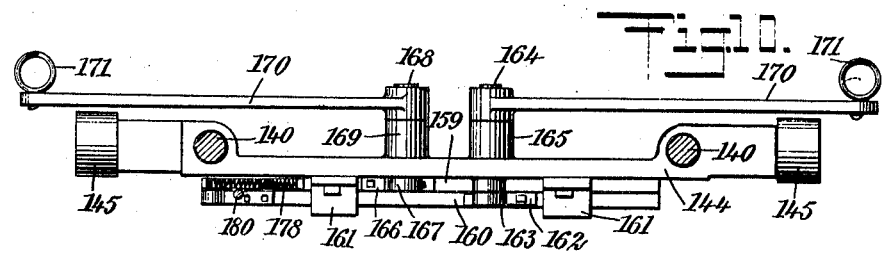
Figure 14:
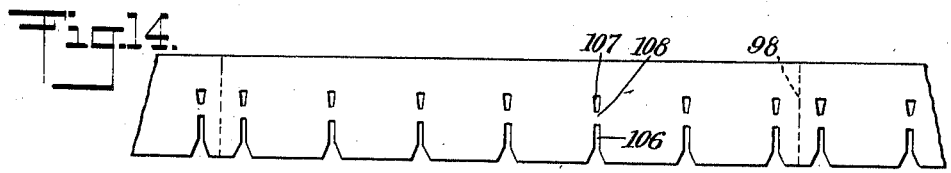
Figure 15:
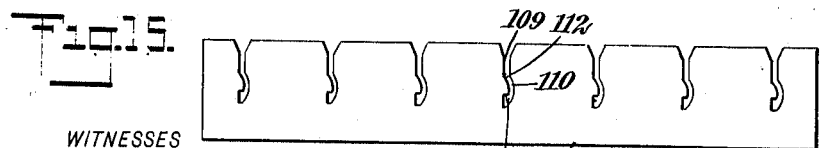
Figure 11:
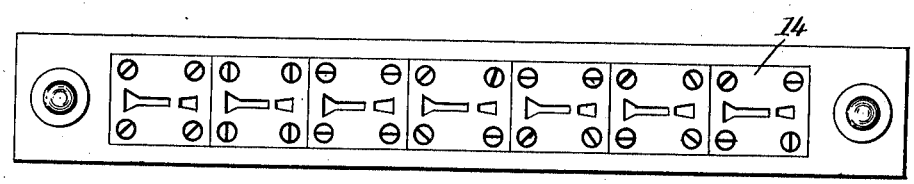
Figure 12:
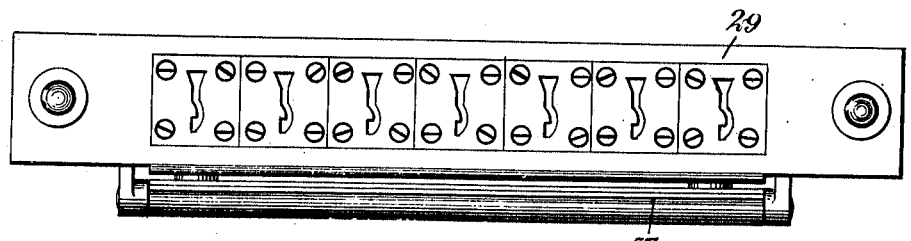
Figure 13:
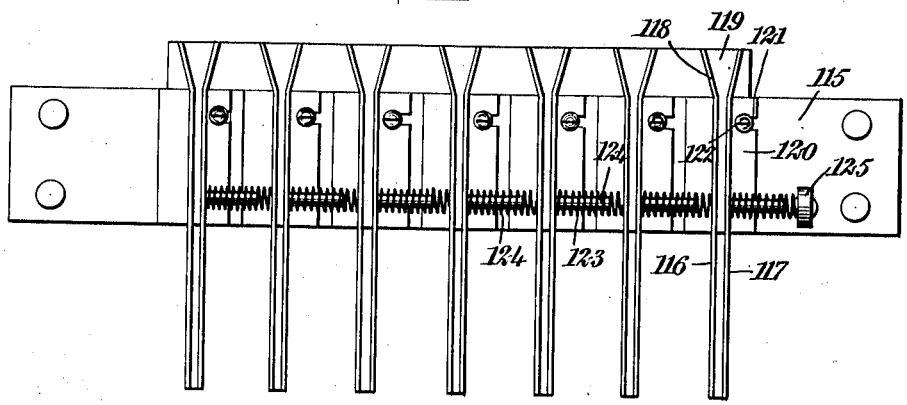

Figure 1 is a side elevation of a machine constructed according to my invention; Fig. 2 is a plan of the machine; Fig. 3 is a front elevation of the machine; Fig. 4 is a rear elevation; Fig. 5 is a vertical longitudinal section through the forward part or front of the machine, the rear portion of the machine being broken away; Fig. 6 is a vertical section through the rear portion of the machine, certain parts being broken away; Fig. 7 is a longitudinal vertical section, certain parts being broken away, through a finger drum which constitutes a feature of the invention; the function of this drum being to insert the transverse strips in the longitudinals; Fig. 8 is an elevation of the drum shown in Fig. 7, viewed from the right side, parts being in section on the line 8—8 of Fig. 7; Fig. 9 is an elevation showing the knife which cuts off the fillers when they are finished, this view showing also, the means for controlling the operation of the knife; Fig. 10 further illustrates the knife, and is a horizontal section taken on the line 10—10 of Fig. 9; Fig. 11 is a plan of the die which is employed in punching the main strips or longitudinals of the filler; Fig. 12 is a similar view, showing the dies which are employed in punching the transverse strips of the fillers; Fig. 13 is a plan of the guide which guides the longitudinal strips into position to receive the transverse strips or cross strips of the fillers; Fig. 14 illustrates one of the longitudinal strips cut off in proper length; in the operation of the machine, these strips are fed through in the position shown in this figure, and the transverse strips are brought into position beneath them, for this reason, I shall refer to these strips hereinafter not only as longitudinal strips, but I shall call them over-strips; Fig. 15 illustrates one of the transverse strips which are fed upwardly by the finger drum so as to engage with the over-strips to form the complete fillers; I shall refer to these strips shown in this figure, as under-strips hereinafter, for the reason that they come into position from the under side; Fig. 16 is a side elevation showing, in detail, part of the means for transmitting the feed movement to the longitudinals or over-strips as they pass through the machine; this view especially illustrates a construction by means of which the operation of the punchers and dies is modified at the ends of the over-strips; Fig. 17 is a cross section taken at one end of the finger drum, and showing a small portion of the drum, illustrating the construction and mode of operation of certain fingers carried by the drum which feed the under-strips to the over-strips; and Fig. 18 is a plan of a complete filler.

Referring more particularly to the parts, and especially to Figs. 1 to 4, 1 represents the frame of the machine, which has the general form shown. In the forward part of the frame in an elevated position, a main shaft 2 is rotatably supported. As indicated in Fig. 3, this shaft projects considerably at the left of the machine, and is provided with a belt pulley 3 by means of which the machine is driven, as will be readily understood. Near the belt pulley 3 a pinion 4 is provided on the main shaft 2, and this pinion operates to drive a main gear wheel 5 which is carried upon the extended shaft 6 of a roll 8. This roll 8 is mounted in a transverse position, and is disposed directly below a similar roll 7. The details of this arrangement are most clearly shown in Fig. 5. As indicated, however, in Figs. 2 and 3, these rolls 7 and 8 are provided with circumferentially disposed knives or cutters 9 which are disposed an equal distance apart and opposite to each other, so that when a strip or band of paper stock is fed between the rolls these rolls operate to cut the same longitudinally into strips. These strips form the longitudinals or over-strips referred to above.

I provide means for punching the stock just before it enters the knife rolls 7 and 8. Referring especially to Fig. 5, I provide a cross bar 10 in the lower part of the frame just forward of the rolls 7 and 8, and upon this cross bar a punch frame 11 is mounted to rock upon a rock shaft 12, as indicated. The upper part of this punch frame 11 is formed with a horizontal die bar 13 in which a die or die plate 14 is received. This die plate is shown in detail in Fig. 11. Above the die bar 13 upwardly projecting guide stems 15 are provided, and on these stems 15 a punch bar 16 is guided up and down. The arrangement for reciprocating this punch bar will be described more fully hereinafter. The under side of the bar is provided with a punch or punch plate 17 which fits the die plate 14, as will be readily understood. On the rock shaft 12 a rigid arm 18 is provided, which extends upwardly as indicated in Fig. 5, and it is through the medium of this arm that the rocking frame 11 is moved to and fro during the operation of the machine.

Referring now especially to Figs. 1 and 6, near the middle of the machine on the upper side of the frame, a bracket 19 is provided, and in this bracket feed rolls 20 and 20ª are mounted, as indicated. The roll 20 is rigidly attached to a shaft 21, which shaft projects at the left of the machine, and carries a rigid sprocket wheel 22. Over this sprocket wheel a sprocket chain 23 runs, and this sprocket chain is driven continuously during the operation of the machine from the sprocket wheel 24 which is rigidly mounted on the main shaft 2 as indicated most clearly in Fig. 3. It should be understood that the stock which is to form the under-strips passes between the rolls 20 and 20ª. Just beyond these feed rolls 20 and 20ª a rocking frame or punch frame 25 is provided, which is similar in construction to the punch or rocking frame 11 described above. The lower end of the frame is pivotally mounted by means of a rock shaft 26 which is supported on a cross bar 27, in the lower part of the frame. The upper part of this punch frame just to the rear of the rolls and on the same level therewith, is provided with a horizontal die bar 28 carrying a die plate 29. The form of this die plate is clearly shown in Fig. 12. The die bar 28 is provided with upwardly extending guide stems 30 on which there is guided a punch bar 31. The under side of this punch bar 31 is provided with a punch or punch plate 32 which fits the die plate 29. As indicated in Fig. 4, the rock shaft 26 is provided with an upwardly extending rigid arm 33, which is similar to the corresponding arm 18 on the rock shaft 12. I provide means for rocking these two punch frames simultaneously. For this purpose, about midway between them, as indicated in Figs. 1 and 2, I provide a cross bar 34 which is attached in the upper part of the frame, as indicated. Near its middle point, this cross bar is provided with a bracket 35 which supports a vertical rocking pin 36. This rocking pin is provided with a rigid arm 37 which extends toward the left of the machine, and this arm 37 is connected by a horizontal link 38 with the upper end of the aforesaid arm 18. This arrangement is shown very clearly in Fig. 5. Near the lower part of the rocking pin an arm 39 extends oppositely to the arm 37. This arm is also rigid with the rocking pin, and is connected by a link 40 with the upper end of the aforesaid arm 33. I provide means for rocking the rocking pin so as to move the arms 37 and 39. For this purpose, near its lower end, as indicated in Fig. 5, the rocking pin is provided with a cam arm 41 which extends forwardly and is provided at its forward end with an upwardly projecting conical roller 42. This roller is in engagement with a helical cam 43 which is rigidly attached to the main shaft 2. From an inspection of Fig. 2, it will be evident that as the cam 43 rotates, the arm 41 will be rocked from side to side. In this way a reciprocating movement is imparted to the links 38 and 40. I provide means, also, for reciprocating the punch bars 16 and 31. For this purpose, in the lower part of the frame, as indicated in Fig. 5, there is provided a rock shaft 44 upon which there are mounted two rockers or jacks 45. These jacks have the form of crab-shaped frames, and the upper ends of the frames are provided with pins 46 to which the ends of eccentric rods 47 are attached. These eccentric rods 47 extend outwardly from eccentric straps 48 which are received on eccentric sheaves 49 which are rigid with the main shaft 2. From this arrangement, it will be evident that as the shaft rotates, the jacks or rockers 45 will rock on the shaft 44. The forward ends of the jacks 45 are connected by pivot pins 50 to upwardly extending links 51, as indicated in Fig. 3, and these links at their upper ends, are pivotally attached to the ends of the punch bar 16. In this way, as the forward ends of the jacks move down, the punch bar 16 slides downwardly on the guide stems 15 so as to punch the stock as it passes toward the rolls 7 and 8. In a similar manner, as indicated in Figs. 1 and 4, the rear ends of the jacks are pivotally attached at 52 to upwardly extending links 53, and the upper ends of these links 53 are pivotally attached to the ends of the punch bar 31. From this arrangement, it will be evident that the movement of the jacks will also reciprocate the punch bar 31 so as to punch the stock which forms the under-strips as it comes from the rolls 20 and 20ª.

Referring especially to Fig. 6, I provide means for cutting the stock which is punched by the punches 32, into strips. For this purpose, the rear face of the punch bar 31 is provided with a knife 54 which coöperates with a similar knife 55 which is fixed to the corresponding face of the die bar 28. The knife 54 is formed with a beveled edge on its outer side. On the outer side of the die bar 28 there is provided a plate 57 which is pivotally mounted at 58 and normally held pressed against the outer side of the knife 55 by means of a spring 59. As the knife 54 descends, its beveled edge 56 strikes the upper edge of the plate 57, and this plate keeps close to it and holds up the paper to the knife; the strip then advances toward a pair of receiving rolls 60 and 61, the former of which is mounted in a horizontal position in a bracket frame 62 secured to the main frame 1. These rolls 60 and 61 are driven continuously when the machine is in operation. For this purpose, the main shaft 2 is provided at the right of the machine, with a belt wheel 63 over which runs a belt 64, and the upper end of this belt runs over a small belt pulley 65 which is rigid on the shaft of the roll 60, as indicated in Fig. 1. The roll 61 is not driven and it is not mounted directly in the frame 62; it is supported on arms 66 which are pivotally mounted at 67 on the side of the frame 62, and is pressed against the face of the roll 60 by means of a helical spring 68 mounted as shown in Fig. 1. Just beyond these rollers 60 and 61 I provide a feed drum 69. The construction of this feed drum is as follows: I provide a finger drum 70 which is formed of two circular heads 71 connected by horizontal stay bars 72 circumferentially disposed on the drum head. Beyond these stay bars 72 longitudinally disposed finger shafts 73 are provided which connect the heads of the drum as indicated. These finger shafts are provided with rigid fingers 74 which are bifurcated, and each of these finger shafts is provided with a short arm 75, as indicated most clearly in Figs. 7 and 8. Each of these short arms 75 is provided with a roller 76 and these rollers run in cam slots 77 formed in two cams 78 which are disposed one near each end of the drum. Each of these cams 78 consists of a heart or main plate 79 and a rim 80, the said heart and rim being connected by connecting plates 81 and 82, as shown. The connecting plate 82 is extended downwardly below the rim 80, as indicated in Fig. 8, and is formed into a slotted head 83, through the slot of which passes an adjusting bolt 84 which is mounted in the frame 62. By means of these adjusting bolts 84 and the slot heads 83, the exact position of the cams 78 may be nicely adjusted. On the upper sides of the fingers 74 on the left side of the drum, as indicated in Fig. 6, nibs 85 are provided, which project upwardly, and these nibs operate as stops to hold the under-strips in position when they are fed to the fingers from the rolls 60 and 61. I provide strip holders 86 which are pivotally mounted on the finger shafts 73, and these strip holders have tongues 87 which project out over the bifurcated fingers; and they are also provided with tails 88 which extend rearwardly in an inclined position toward the interior of the drum. On the finger shafts 73 coil springs 89 are provided, which thrust against the tails 88, and in this way the tongues 87 are spring pressed toward the fingers.

Referring especially to Fig. 7, the drum 70 is rotatably mounted on a fixed drum shaft 90, and one end of this shaft is loosely mounted in the heart 79 of the cam 78 which is disposed at the right of the machine. It is also loosely mounted in the aforesaid bracket frame 62, and projects beyond this bracket frame to receive an adjusting arm 91 which is rigidly attached to it. This adjusting arm 91 extends downwardly, and is provided at its lower end with a slotted head 92 through the slot of which an adjusting bolt 93 passes, the said bolt being seated in the side of the bracket frame 62. This adjusting arm 91 is provided for the purpose of adjusting the position of a tail block 94 which is rigidly attached to the shaft 90 near the middle of the drum, and in alinement with the tails of the strip holders. As indicated most clearly in Fig. 6, this block has the form of a quadrant, presenting a circumferentially disposed face 95 on its under side. The arrangement is such that as the fingers descend at the right of the drum, as indicated in Fig. 6, the tails slide upon this face 95 and rotate the strip holders on the finger shafts. This arrangement is adopted so as to enable the fingers to check the under-strips one by one as they come from the rolls 60 and 61. In order to facilitate this operation, the frame 62 is provided with a plurality of arc-shaped guide bars 96 which extend upwardly over the forward side of the drum. These bars are attached at their forward ends to the frame 62, and just to the rear of the rolls 60 and 61 they are offset so as to present horizontal extensions 97, as indicated in Fig. 6. These horizontal extensions 97 form a shelf which receives the under-strips as they come from the rolls 60 and 61. It should be understood that the bars 96 are disposed apart so as to enable the fingers to pass up between them, as indicated in Fig. 6. In this way each strip is picked up by a finger, and immediately after it touches the finger the tail of the strip holder carried by that finger, leaves the tail block 94, and its spring then enables it to clamp the strip and hold it in position. My reason for providing two cams for operating the finger shafts instead of one, is simply one of convenience of design, as it is found that with one cam only the rollers 76 carried by the arms become too crowded to operate efficiently.

An inspection of Fig. 14 will show that the over-strips are punched by the dies at points equidistant. When these strips are cut off in the finished filler, they are cut at the points indicated by the dotted lines 98. In this way short stub ends are left at the sides of the filler, which come against the sides of the packing case. It will be clearly seen, then, that the punch openings formed in the over-strips which are to come at the ends of the strips, must be closer together. On this account it is necessary to make special provision for this in the construction of the drum. The special provision referred to is indicated in Fig. 17. The special arrangement consists in forming the drum so that at diametrically opposite points, the adjacent fingers are placed closer together, and in this connection, it should be understood that with one complete rotation of the drum, sufficient under-strips will be fed to the over-strips to form two complete fillers. It is found that with the finger shafts 73 too close together it is not possible to provide for the operation of the strip holders, because their tails will obstruct each other. For this purpose, I provide special strip holders 100 which are mounted on the finger shafts disposed rearwardly with respect to the direction of rotation. These strip holders are formed without tails, but their hubs 101 are provided with pins 102 which are engaged by coil springs 103 which tend to hold the tongues 104 down against the forward faces of the fingers. These tongues 104 are attached by chains 105 to the fingers next in advance, so that the finger next in advance holds the fingers 104 in the open position to receive the strip. In other words, at two points on the drums, it is necessary to control the strip holders from the fingers next in advance. It will of course be understood that as the finger having the tongue 104 rotates upwardly, it will eventually push the tongue 104 upwardly so as to relieve the tension in the chain 105, and allow the spring 103 to hold the tongue against the face of its corresponding finger. It should be understood that the over-strips indicated in Fig. 14, as they pass through the forward punches, are punched as indicated; that is, they are formed on their lower edges with upwardly extending slots 106, and beyond the ends of these slots eyes 107 are formed in alinement therewith. In this way a bridge 108 of the material of which the strip is formed, is porduced between the slot and the eye. The under-strips are punched by the dies so as to form slots 109 extending downwardly from their upper edges. The lower portions of these slots have lateral offsets 110. At these offsets 110 the edges of the slots 109 are formed with laterally projecting teeth 111, there being one tooth in each slot. These teeth have inclined upper edges 112 and abrupt lower edges. From this arrangement, it should be understood that if the under-strips are presented to the over-strips so that the slots 109 and 106 register with each other, the strips can be pushed into engagement in such a way that the bridge 108 will slide over the teeth 111, and the teeth 111 can be made to engage the eyes 107. In this way the under-strips can be interlocked with the over-strips simply by forcing them together as suggested.

Referring now to Fig. 1, the dotted outline indicates the continuous over-strips 113 as they pass toward the upper side of the drum. Before reaching the drum these strips are guided into proper positions by means of a multiple guide 114. The construction of this guide is most clearly shown in Fig. 13. It comprises a transverse base plate 115 supported in the bracket frame 62. On the upper side of this plate 115 a plurality of guide plates 116 are provided, which are fixed in position. Opposite to these plates 116 similar plates 117 are provided, which are, however, movable toward the fixed plates. The forward ends of these plates 116 and 117 are provided with outwardly diverging flanges 118, so that enlarged receiving mouths 119 are formed at the forward ends of the guides which assist in directing the strips through the guide spaces between the plates. The movable guide plates 117 are formed at their lower edges with horizontal flanges 120 which rest upon the plate 115, and these flanges are formed each with a slot 121 receiving a guide screw 122 which is fixed in the base plate. These guide screws are disposed near the guides 119. At the opposite side of the base plate, that is, at the rear edge, a plurality of springs 123 are provided, which are disposed between the guides. Each spring is held in position by a stud 124 which projects laterally from the side of the movable guide plate. All of these springs press their corresponding movable guide plates toward the fixed guide plates, so that a slight frictional pressure is exerted upon the sides of the over-strips as they pass through the guides. At the right of the base plate 115 a lug 125 is provided against which the right-hand spring thrusts. As the over-strips 113 pass over the drum the fingers which carry the under-strips present them in succession to the slots 106, and as they are presented, the over-strips are forced downwardly so as to bring about the interlocking connection between the strips by means of a beater 126. The construction of this beater is clearly shown in Fig. 6. In the upper portion of the drum frame 62 which extends upwardly for this purpose, a transverse rock shaft 127 is mounted, and this rock shaft is provided with a rigid arm 128. This arm is connected by a link 129 with a crank 130. This crank is rigid with a gear wheel 131, and this gear wheel is in turn driven by a pinion 132 which is rigidly attached to the shaft of the roller 60 referred to above. Rigid with the rock shaft 127 there is provided a horizontal arm 133, on the end of which a stem 134 is pivotally hung. The lower end of this stem 134 carries a stamper or beater plate 135. In order to give this beater plate a parallel movement, the lower end of the stem 134 is connected by a link 136 with the frame 62. From this arrangement, it should be understood that as the rock shaft 127 is rocked by the crank 130, the beater plate 135 will reciprocate up and down so as to strike the upper edges of the over-strips 113 and force them downwardly into perfect engagement with the under-strips.

As indicated most clearly in Fig. 6, the bars 96 referred to above have horizontal extensions 137 which operate as guides for the filler web. In this connection, it should be understood that the filler is formed in a continuous band or web. This filler band is cut by means of a multiple knife 138 which operates at the proper moments to cut the over-strips midway between the adjacently placed under-strips. The mechanism for mounting and operating this knife will now be described: The knife is mounted upon a rocking frame 139 and this frame comprises side bars 140, the lower ends of which are pivotally attached to a rock shaft 141. The upper ends of the side bars 140 are connected by a cross head 142, as indicated most clearly in Fig. 9. The ends of this cross head 142 are offset upwardly and forwardly so as to form arms 143, the purpose of which will appear more fully hereinafter. Slidably mounted on the side bars or guide bars 140 there is provided a moving cross head 144. This cross head consists simply of a horizontal elongated plate which is enlarged at its ends so as to receive guide openings for the bars 140. To the ends of this cross head 144 links 145 are pivotally attached, and these links extend downwardly so as to attach to rocker arms 146, as indicated in Fig. 6. These rocker arms 146 are rigidly attached to a rock shaft 147 mounted in the lower part of the rame below the knife.

Referring now to Fig. 1, the means for actuating the rock shaft 147 will be described: This comprises a rigid rocker arm 148 which is carried by the rock shaft 147, and this rocker arm 148 is connected by a link 149 with an offset crank 150 which is formed upon the outer side of a gear wheel 151. This gear wheel is mounted on the side of the frame above the belt wheel 63, and is rotated by a gear wheel 152 which is rigid on the shaft 6. These gears 151 and 152 are elliptical gears so as to give a quick movement of the cross head 144 at the time that it descends toward the filler web. At the time that the cross head 144 has descended so as to cut the filler web, the knife frame 139 is rocked forwardly so that the knife advances with the continuous movement of the filler web. For the purpose of rocking the knife frame as suggested, I provide an offset bar 153, which is clearly shown in Figs. 1 and 2. This bar is pivotally attached at its rear end to fixed clips 154 on the upper side of the fixed cross head 142, as indicated most clearly in Fig. 4. This bar 153 is given a reciprocating movement by means of a mutilated pinion 155 which drives a double rack 155ª on the end of the bar.

Referring to Fig. 5, it will be seen that the shaft 156 is driven from the shaft 6 by means of gear wheels 157 and 158 which mesh together as shown. This driving means is also illustrated in Fig. 2.

Returning to the description of the knife-operating mechanism, and referring especially to Figs. 9 and 10, on the face of the cross head 144 knife bars 159 and 160 are slidably mounted in suitable guides 161. The knife bar 160 is provided on its upper edge with lugs 162, and between these lugs there is received a projecting toe 163 which is rigidly carried by a rocking pin 164. This rocking pin is rotatably mounted in a bearing 165 formed on the side of the cross head 144. On the upper edge of the knife bar 159 similar lugs 166 are provided, and in the space between these lugs there projects a toe 167 which is rigidly carried by a rocking pin 168 which is also rotatably mounted in a bearing 169 on the face of the cross head. To these rocking pins 164 and 168 levers 170 are rigidly attached, and these levers extend toward the ends of the cross head and are connected by helical springs 171 with the ends of the aforesaid arms 143. On the knife bar 159 a plurality of blades or cutters 172 are provided. These blades are disposed an equal distance apart and coöperate with similar blades 173 which are attached to the knife bar 160. From this arrangement, it will be understood that the spring tension acting upon the levers 170 tends to move the toes 163 and 167 outwardly; that is, away from each other, and hence the springs 171 operate to hold the blades 172 and 173 in their closed position; that is, overlapping at their cutting edges. On the knife bar 159 there is provided a lug 174, and this lug presents an abrupt shoulder at its left end. Near the lug 174 on the knife bar 160, a dog 175 is pivotally attached by means of a suitable bracket 176. This dog has an upwardly projecting tail 177 to which a small coiled spring 178 is attached, the forward end of said spring being attached to a fixed clip 179 attached to the lug 174, as shown. From this arrangement, it should be understood that when the knife bar 160 is moved toward the left, and the knife bar 159 toward the right, the spring 178 will operate to pull the dog 175 down into a horizontal position, so that its end engages with the abrupt shoulder of the lug 174, in this way operating to hold the knife blades apart in the manner indicated in Fig. 9 in dotted lines.

From the dog 175 a stem 180 extends upwardly, and this stem is slidably mounted through a guide plate 181 fixed on the cross head 142. It should be understood that this stem slides freely through the guide plate 181 in an upward direction, but on its upper end which projects beyond the plate, stops or check nuts 182 are placed, which limit the downward movement of the stem. By this means the dog 175 is pulled out of engagement with the lug 174 when the knife has reached the limit of its downward movement. The springs 171 then operate to bring the blades 172 and 173 together so as to cut all of the over-strips constituting the filler web. In this connection, it should be understood that the blades are disposed at a proper distance apart to receive the over-strips respectively.

In order to set the knife bars 159 and 160 apart so that the device may be sprung by pulling out the dog 175, I provide, on the under side of the cross head 142, downwardly projecting brackets 183. These brackets are V-shaped, and the lower ends are disposed in the path of the levers 170 as they move upwardly. From this arrangement, it will be understood that as the cross head 144 moves upwardly, at the end of the upward movement the levers 170 are detained by the brackets 183 so as to rock the toes 163 and 167. This separates the blades and enables the dog 175 to drop down and press the knife bars apart, as will be readily understood.

In the operation of the knife, it should be understood that when the knife has descended and during the time that it is being applied to the filler web to cut it, the knife frame is being rocked forwardly with the advancing movement of the filler web. In this way the knife makes a clean cut through the over-strips.

In order to guide the filler web and the fillers as they are formed from the web, I provide, under the knife, guide bars 184. These bars are pivotally attached at 185 to the forward end of a delivery shelf 186. In this way it projects under the knife and is freely movable; that is, it is depressible. A spring 187 is provided, which is attached to fixed arms 188 on the bars 184, and which tend to hold the bars in a horizontal position. These bars are pushed downwardly by the filler web when the filler web is being cut off.

Referring again to the finger drum illustrated in Fig. 7, the means for driving the drum will now be described: For this purpose, the left-hand head is provided with a tubular sleeve or shaft 189, and this shaft is rotatably mounted in the adjacent bracket 62. Beyond this point the shaft 189 is provided with a rigid sprocket wheel 190 which is driven by means of a chain 191. This chain 191 passes around a sprocket wheel 192 carried by the shaft 6, as indicated most clearly in Figs. 2 and 3.

In order to modify the operation of the punch 17 so as to make the punch openings come closer together at the points which will be the ends of the cut off over-strips, I provide an arrangement illustrated in Figs. 5 and 16. For this purpose, a number of the teeth of the main gear wheel 5 are stripped off so as to leave a blank spot or face 193. From this arrangement, the transmission from the pinion 4 will not be continuous, but will be interrupted when this blank face 193 comes opposite to the pinion 4, as indicated in Fig. 16. At this time, of course, the feeding movement of the stock passing between the rolls 7 and 8, will cease, and the result will be that a smaller movement will occur at this time than at other times. The consequence of this is that the punch marks will come closer together at these points. In order to continue the rotation of the regular feeding movement after this has occurred, the periphery of the pinion 4 is provided with a giant tooth 194 which projects outwardly therefrom as shown, and this tooth is adapted to engage with a similar tooth 195 which is provided adjacent to the blank face 193 on the large gear. This arrangement permits the pinion to make substantially a half revolution at this time without affecting the gear wheel 5; but after this half revolution is complete, the giant tooth 194 strikes the tooth 195 and advances the main gear, so that its teeth mesh again with those of the pinion in the normal regular way.

The mode of operation of the complete machine will be briefly described: The stock which is to form the over-strips is fed between the rollers 7 and 8. This stock first passes between the punch 17 and the die 14. The knives 9 on the rollers 7 and 8 cut the stock into continuous bands or strips. As the stock advances under the punch 17, the punch frame 11 is rocked to and fro. The mechanism is designed in such a way that the punch advances with the web on its forward stroke; that is, on its stroke which moves toward the rollers 7 and 8, it has substantially the same speed as the stock. In this way the punch passes through the stock and does not tear it. The continuous rotation of the rollers 7 and 8 continues to draw in the stock, and when the punch 17 is out of engagement with its die, the stock advances over the die without being punched. From this arrangement, the punch operates to produce equidistant punch openings in the stock. When the punched stock is cut into strips, the strips present the appearance indicated in Fig. 14. It will be observed that the knives cut the strips so that the slots 106 are formed at one edge of the strips. These strips then pass toward the rear of the machine, as indicated by the dotted lines in Fig. 1, and pass through the guide 114 and over the finger drum 69. As they pass over the finger drum the drum fingers which carry up the under strips, insert the under strips in the slots 106, and the beater 126 operates to force the over-strips downwardly so that they interlock with the under-strips by means of the teeth 111 which engage in the eyes 107. From this point the web which is to be cut off into lengths to form the fillers, advances to a point under the knife 138, and the knife operates to cut the over-strips of the fillers at the proper points. It should be understood that the knife advances with the filler web at the moment that it is cutting the same, from which arrangement it follows that the knife does not bend or deform the filler. For this purpose, the knife is mounted on the rocking knife frame 139, and it will be understood that the knife is in an elevated position on the return movement of the frame. On the movement of the frame 139 which is in the direction in which the web is advancing, the knife descends and cuts the filler at the proper point. The stock which is to form the under-strips is fed between the rollers 20 and 20* and under the punch 32. The individual punches are disposed the same distance apart as the slots 106, and this punch 32 advances with the stock coming from the rolls when the punch is operating. On its return movement the punch is open, so that it permits the stock to advance under it. On each downward stroke the knife 54 of the punch bar cuts off a strip of the proper width, and this strip is held up to the knife by the plate 57 in the space before the rollers 60 and 61. These rollers advance the strip onto the shelf formed at the point 97, from which point the strips are taken by the fingers 74. These fingers move upwardly with the drum and present the under-strips to the overstrips as described in detail.

Having thus described my invention, I claim as new and desire to secure by Letters Patent:

1. In a machine of the class described, in combination, means for guiding and advancing a plurality of strips in parallel arrangement and disposed apart, a drum disposed transversely near the path of said strips, a plurality of fingers pivotally mounted in said drum, cam levers controlling the positions of said fingers, cams coöperating with said levers, strip holders coöperating with said fingers to hold transverse strips thereupon and spring-pressed toward engagement with said fingers, and a fixed member adapted to be engaged by said strip holders to hold the same away from said fingers.

2. In a machine of the class described, in combination, means for guiding and advancing a plurality of strips in substantially parallel arrangement and disposed apart, a transversely disposed drum, a feed shelf formed near said drum and adapted to receive transverse strips, said feed shelf having openings, a plurality of fingers carried by said drum and passing upwardly through said openings to take the transverse strips therefrom, and means for guiding said fingers to present said transverse strips to said first strips.

3. In a machine of the class described, in combination, means for guiding and advancing a plurality of strips in substantially parallel arrangement and disposed apart, a drum disposed transversely, a feed shelf near said drum adapted to receive transverse strips, said feed shelf having openings therein, a plurality of fingers carried by said drum and passing upwardly through said openings to take the transverse strips therefrom, strip holders adapted to grasp said strips when received by said fingers, and means for guiding said fingers to present said transverse strips to said first strips.

4. In a machine of the class described, in combination, means for guiding and advancing a plurality of strips in substantially parallel arrangement and disposed apart, a drum disposed transversely near the path of said strips, a feed shelf near said drum adapted to receive transverse strips and having openings therein, a plurality of fingers carried by said drum and passing upwardly through said openings to take said transverse strips, spring-pressed strip holders coöperating with said fingers to grasp the transverse strips when taken thereby, means for holding said strip holders open when said fingers receive said transverse strips, means for releasing said fingers to grasp said strips, and means for guiding said fingers to present said transverse strips to said first strips.

5. In a machine of the class described, in combination, means for advancing and guiding a plurality of over-strips in substantially parallel arrangement, a drum shaft disposed transversely therebelow, a drum rotatably mounted on said shaft, a plurality of fingers carried by said drum and adapted to hold under-strips, said fingers having cam levers for controlling the positions thereof, cams mounted on said shaft and controlling the positions of said cam levers, means for adjusting said cams, spring-pressed strip holders coöperating with said fingers to hold the under-strips, a block mounted on said shaft and adapted to engage said strip holders to open the same in receiving the under-strips, and means for adjusting the position of said block.

6. In a machine of the class described, in combination, means for forming and advancing a continuous filler web having longitudinal strips and transverse strips, a knife frame, a knife guided in a substantially vertical direction on said frame, said knife comprising knife bars adapted to slide longitudinally with respect to each other, blades carried by said knife bars, means tending to hold said blades closed, means for moving said knife bars to open said blades on the upward movement of said knife, a latch affording means for holding said blades apart, and a member fixed on said frame and adapted to move said latch to release said knife bars on the downward movement of said knife.

7. In a machine of the class described, in combination, means for forming and advancing a continuous filler web, a knife frame, knife bars slidably mounted transversely on said frame, blades carried thereby, springs tending to hold said knife bars with said blades closed, means for guiding said knife bars up and down on said frame, means for locking said knife bars in the open position of said blades on the upward movement of said knife, and means for releasing said knife bars to enable said blades to engage each other on the downward movement of said knife bars.

8. In a machine of the class described, in combination, a punching device operating upon the longitudinal strips, a second punching device operating upon the transverse strips, a jack connected with said punching devices, means for rocking said jack to operate said punches, means for guiding the longitudinal strips toward said second punching device, a drum, means for advancing the transverse strips from said second punching device to said drum, fingers carried by said drum adapted to receive said transverse strips, and means for guiding said fingers to present said transverse strips to said longitudinal strips.

9. In a machine of the class described, in combination, a punch frame, a punch carried thereby and operating upon the longitudinal strips, a second punch frame, a second punch carried by said second punch frame and operating upon the transverse strips, a rock shaft, means connecting said rock shaft with said frames for rocking the same simultaneously, a jack connected with said punches, means for rocking said jack to actuate said punches, and means for feeding said strips into interlocking connection.

10. In a machine of the class described, in combination, a punch frame, a punch carried thereby adapted to punch the longitudinal strips, a second punch frame, a punch carried thereby and operating upon the transverse strips, a rock shaft disposed between said frames, links connecting said rock shaft with said frames for rocking the same, a jack between said frames, means connecting said jack with said punches for actuating the same, means for rocking said jack, and means for feeding said strips into interlocking connection.

11. In a machine of the class described, in combination, means for forming and advancing a continuous filler web composed of longitudinal strips and transverse strips, a knife above said web, means for depressing said knife to sever said web, said knife having blades projecting downwardly through said web, and a depressible shelf supporting said web under said knife.

In testimony whereof I have signed my name to this specification in the presence of two subscribing witnesses.

GEORGE R. KENDRICK.

Witnesses:
JOHN M. SMITH,
ADAH HALFHILL.